March 13, 1956 P. PAPP 2,737,821
FRICTIONAL DRIVING MECHANISMS
Filed Jan. 23, 1951
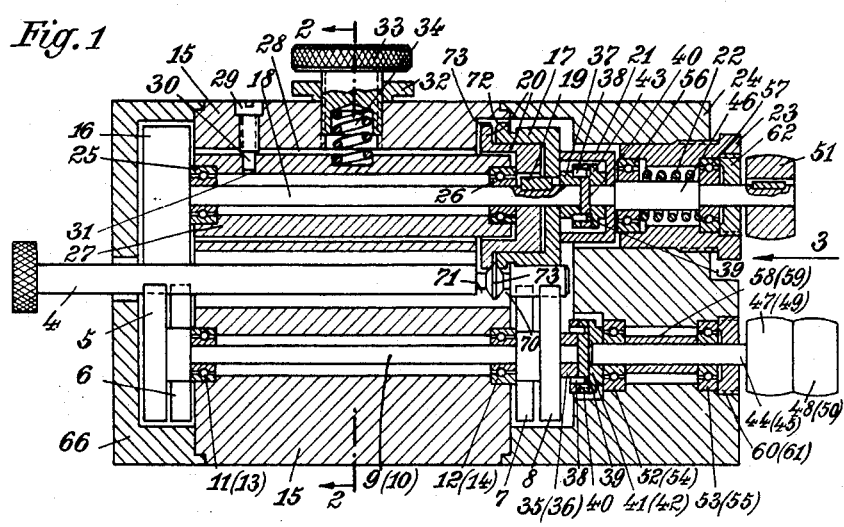
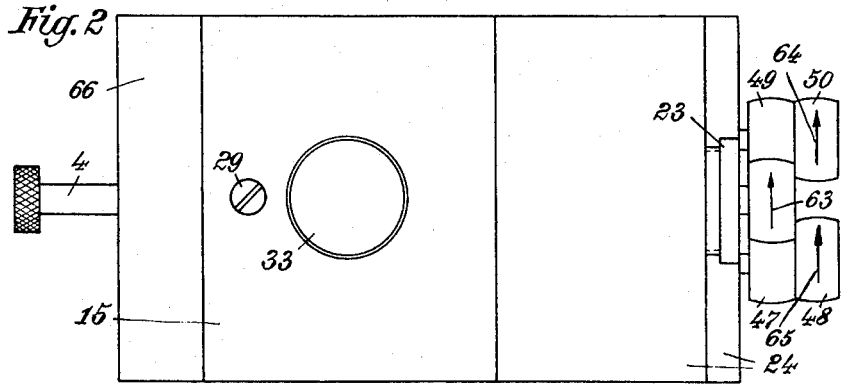
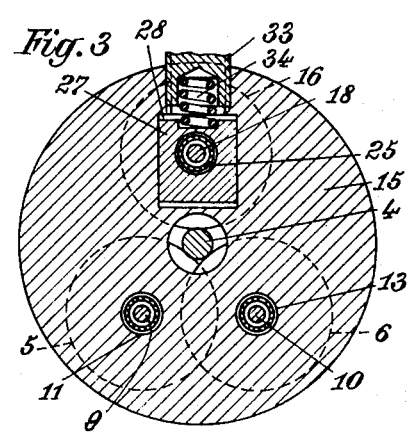
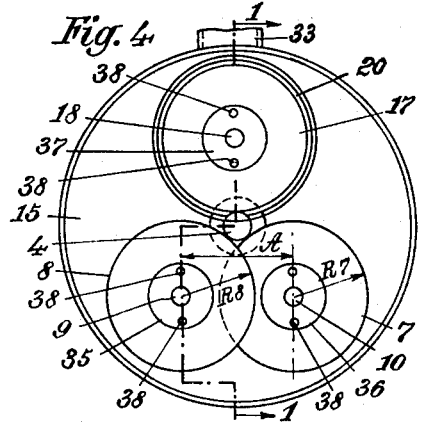
Inventor
Paul Papp
by *F. Millard E. Hackenback*
Attorney

United States Patent Office 2,737,821
Patented Mar. 13, 1956

2,737,821

FRICTIONAL DRIVING MECHANISMS

Paul Papp, Berlin, Germany

Application January 23, 1951, Serial No. 207,324

11 Claims. (Cl. 74—209)

The present invention relates to a mechanism for driving spindles at a high speed by means of friction wheels.

The operation of spindles at a high speed by friction wheels, for instance for the purpose of operating a centrifuge, is well known in the art, the arrangement being such that a comparatively large conical disk is kept in engagement with a conical section of the spindle having a small diameter. Experience has shown, however, that the continuous unbalanced pressure of the driving friction disk is liable to result in excessive wear of the bearings of the spindle, thus requiring a frequent repair of such bearings to eliminate lost motion.

It is the object of the present invention to provide a driving mechanism for high speed spindles in which the means journalling the spindle are subjected to a minimum of wear.

According to the present invention the spindle rotating at a high speed is held between a friction wheel journalled resiliently and a pair of friction wheels journalled rigidly.

While it is known to hold spindles or shafts between three contacting faces, one of such faces being resilient; such prior arrangement served the purpose only of adjusting a shaft, for instance a pivot of a telescope, relative to the optical axis of the latter.

It has also been proposed to keep a high speed shaft in position by three ball bearings displaced through 120° relative to each other. In such arrangement, however, each of the three ball bearings was rigidly mounted, means for driving the spindle being provided in addition to and independently of the ball bearings. The frictional driving mechanism, according to the present invention, offers the advantage that any lost motion of the spindle will be automatically taken up in event of gradual wear, the pressure of the friction wheels being adapted to be increased to any desired degree without imposing a load on any spindle bearings, and that the spindle does not for operation require the provision of additional masses as would be liable to produce critical vibrations at comparatively low speeds. It has been found that the driving mechanism of the present invention permits spindles to be driven at speeds of the order of some hundred thousands of revolutions per minute without critical oscillations or vibrations.

The maximum speed of shafts journalled in ball bearings is about 25,000 revolutions per minute. For very high speeds of the spindle, therefore, it will become necessary to choose a high ratio of transmission between the spindle and the friction wheels since the shafts of the latter must be journalled in ball bearings. Where a pair of friction wheels is used having their faces mounted in opposed relationship, the spindle will come to rest between the pair of friction wheels at a level which is the lower the smaller the spindle diameter is, until finally the spindle will arrive in a position liable to jam. Such jamming is avoided in accordance with another feature of the present invention by making the distance of the axes of the pair of friction wheels smaller than the aggregate of their radii, the friction wheels constituting the rigidly journalled pair being arranged in overlapping relationship.

Where the spindle is journalled at two spaced points, the novel set of frictional wheels being provided at each of the two points, it will become possible to shorten the distance between the point where the spindle is driven and the point where the spindle is driving other means, thereby ensuring a complete elimination of any critical vibration even with the highest speeds of the spindle. Experience has shown that where the spindle is exclusively journalled between friction wheels in accordance with the present invention, such arrangement corresponding, in fact, to the sextuple friction drive of the orthodox design, the spindle is capable of sustaining considerable axial thrust without being displaced. However, special provisions may be made to support the spindle against extraordinary axial thrusts by providing for an interlocking relationship between the spindle and at least one of the friction wheels extending over a short axial section of the spindle. Preferably, one of the two interlocking elements is composed of two separate parts capable of relative axial displacement, whereby the admissible lost motion of the spindle may be easily and accurately adjusted and re-adjusted.

In order to reduce the cost of manufacture, all of the friction wheels are preferably so dimensioned as to have the same diameter. In order to avoid unnecessary friction the radius of the point of engagement of the spindle with the element interlocking therewith equals the radius of the point of contact of the spindle with the other friction wheels.

In order to eliminate critical vibrations arising between the friction wheels and the pulleys driven by a motor, each of the shafts of the friction wheels is preferably driven by a separate shaft which is co-operatively connected with the co-ordinated friction wheel shaft by an elastic clutch capable of absorbing vibrations. The resiliently journalled friction wheel is kept in engagement with the shaft preferably by adjustment of a holder, being adjustable in a guide provided in the spindle casing and subjected to the influence of a biased spring, the bias of which can be varied from the outside. The axial pressure is preferably controlled by a bushing provided in the casing of the driving mechanism, such bushing being settable from the outside.

A preferred embodiment of the present invention is illustrated in the accompanying drawings in which Fig. 1 illustrates a sectional view of the mechanism for driving a spindle at a high speed by means of friction wheels, the section being taken along the line 1—1 of Fig. 4;

Fig. 2 is a plan view of the spindle drive mechanism;

Fig. 3 is a sectional view of the mechanism, the section being taken along the line 2—2 of Fig. 1; and Fig. 4 is an elevation of the spindle driving mechanism viewed in the direction of the arrow 3 shown in Fig. 1, the casing being omitted.

A spindle 4 which is to be rotated at a very high speed rests on two pairs of friction wheels 5, 6 and 7, 8, each friction wheel being rigidly attached to a shaft 9, or 10 respectively, such shafts being journalled in a casing 15 by means of ball bearings 11, 12, 13 and 14. By means of friction wheels 16, 17 the spindle 4 is held in frictional engagement with the pairs of friction wheels 5, 6, and 7, 8 respectively, under a certain pressure, the friction wheel 16 being fastened to a shaft 18, while the friction wheel 17 is splined on the shaft 18 by means of a key 19 so as to be slidable on shaft 18 but connected for common rotation therewith. Adjacent to the friction wheel 17 a cup-shaped member 20 is attached to the shaft 18, the wheel 17 being thus movable towards and away from the member 20. The relative position of the elements 17 and 20 is controlled by a bushing 21 and by a helical spring 22, the latter being adapted to be biased by a threaded sleeve 23 engaging a threaded bore provided in a casing 24 which is attached to the casing 15 by suitable means not shown. The spring 22 serves the purpose of automatically controlling the axial pressure.

The shaft 18 is journalled by means of ball bearings 25 and 26 in a holder 27 formed by a block of rectangular cross-section slidably accommodated in a suitable recess constituting a guide 28 provided in the casing 15, whereby the holder 27 is movable in radial direction towards and away from the spindle 4. The holder 27 is secured against axial displacement by engagement with a suitable vertical bore provided in the holder 27 of the cylindrical end 30 of the threaded bolt 29 screwed into a threaded bore provided in casing 15. The bolt 29 will safeguard the spindle 4 against any thrust or shocks exceeding the pressure exerted by the spring 22. A helical spring 34 bears against the top of the holder 27, thereby producing the required pressure of engagement with the friction wheels 5, 6, 7, 8, 16, and 17 of the spindle 4. The helical spring 34 is held in position and biased by a setting screw 33 engaging a tapped bore provided in casing 15, a counternut 32 being provided to arrest the setting screw 33 and to prevent accidental rotation thereof. In this manner, any wear of the friction wheels will be automatically compensated for by displacement of the holder 27 in radial direction.

The shafts 9, 10 and 18 are driven by means of elastic clutches including clutch elements 35, 36 and 37 attached to the shafts and provided with pins 38. The pins 38 of each clutch element engage holes 39 of an elastic washer 40. Clutch elements 41, 42 and 43 are attached to driving shafts 44, 45 and 46 and provided with projecting pins angularly displaced relative to the pins 38 and engaging suitable holes provided in the washers 40. The shafts 44 and 45 are journalled in casing 24 by means of ball bearings 52, 53, 54, and 55, whereas the shaft 46 is journalled within the sleeve 23 by means of ball bearings 56 and 57. The arrangement is such that the driving shafts 44, 45 and 46 are axially aligned with the shafts 9, 10, and 18 respectively. The bearings 52, 53, 54, 56, and 57 are held in position by spacing sleeves 58, 59 and by suitable threaded rings 60, 61 and 62 engaging threads provided in the casing 24, and the sleeve 23 respectively.

The driving shafts 44, 45 and 46 are driven in the direction of the arrows 63, 65 by pulleys 47, 48, 49, 50, and 51, a driving motor not shown provided with a twin pulley being connected, on the one hand, by an endless belt with the pulley 51 on shaft 46 and, on the other hand, by a second endless belt with the two pulleys 47, 49, or 48, 50 respectively.

A cover 66 is attached to the one end face of the casing 15, whereas the casing 24 is attached to the other end face of the casing 15, whereby the driving mechanism is encased in a sealed manner minimizing the loss of oil or the entry of dust.

Fig. 4 shows that the distance A of the axes of the pair of friction wheels 7, 8 is smaller than the aggregate $R_7 + R_8$ of their radii.

As illustrated in Fig. 1, the spindle 4 is provided with two adjacent peripheral grooves 70 and 71, the adjacent sides of such grooves being conical so as to provide for a peripheral ridge 73 having substantially the same diameter as the spindle 4.

The wheel 17 which is cup-shaped and engages in a nested relationship over the cup-shaped member 20 has a marginal flange which extends into the groove 70 and is provided with a conical face 72 engaging the ridge 73 near the periphery thereof. Similarly, the cup-shaped member 20 is provided with a marginal flange extending into the groove 71 and having a conical face 74 which engages the ridge 73 near its periphery. In this manner, the two elements 20 and 17 constitute, in effect, a composite friction wheel which is arranged in an axial interlocking relationship with the spindle so as to be capable of supporting same against axial thrust, such interlocking relationship extending but over a short axial section of the spindle, same being the section provided with the grooves 70 and 71.

Moreover, it will be noted from Fig. 3 that all of the friction wheels have substantially the same diametrical dimensions and are holding the spindle 4 out of contact with the casing, as it were, in a floating condition.

While the present invention has been described with reference to a specific embodiment thereof, it is to be understood that the same is in no way limited to the details of such embodiment, but is capable of numerous modifications within the scope of the appended claims.

What I claim is:

1. A frictional driving mechanism for rotating a spindle at high speed in which said spindle is held between two sets of friction wheels, each set consisting of a resiliently journalled friction wheel and a pair of rigidly journalled friction wheels, the drive to said friction wheels being applied at a point external to both sets of friction wheels.

2. A frictional driving mechanism for rotating a spindle at high speed in which said spindle is held between two sets of friction wheels, each set consisting of a resiliently journalled friction wheel and a pair of rigidly journalled friction wheels, the distance between the axis of the two friction wheels constituting said pair being smaller than the aggregate of their radii, and the drive to said friction wheels being applied at a point external to both sets of frictional wheels.

3. A frictional driving mechanism for rotating a spindle at high speed in which said spindle is held between two sets of friction wheels, each set consisting of a resiliently journalled friction wheel and a pair of rigidly journalled friction wheels, the spindle and one of the friction wheels being arranged in an axially interlocking relationship and the drive to said friction wheels being applied to a point external to both sets of friction wheels.

4. A frictional driving mechanism for rotating a spindle at high speed in which said spindle is held between two sets of friction wheels, each set consisting of a resiliently journalled friction wheel and a pair of rigidly journalled friction wheels, the spindle and one of the friction wheels being arranged in an axially interlocking relationship, one of the interlocking elements being composed of two parts, one of said two parts being mounted for axial displacement, and a drive to said friction wheels being applied to a point external to both sets of friction wheels.

5. A frictional driving mechanism for rotating a spindle at high speed in which said spindle is held between two sets of friction wheels, each set consisting of a resiliently journalled friction wheel and a pair of rigidly journalled friction wheels, all of the friction wheels having the same effective diametrical dimensions, and a drive for said friction wheels being applied to a point external to both sets of friction wheels.

6. A frictional driving mechanism for rotating a spindle at high speed in which said spindle is held between two sets of friction wheels, each set consisting of a resiliently journalled friction wheel and a pair of rigidly journalled friction wheels, the spindle and one of the friction wheels being arranged in an axially interlocking relationship, the points of contact of the interlocking parts of the spindle with at least one of the friction wheels having the same radial distance from the axis of the spindle as the points of contact thereof with the other friction wheels, and a drive to said friction wheels being applied to a point external to both sets of friction wheels.

7. A frictional driving mechanism for rotating a spindle at high speed in which said spindle is held between two sets of friction wheels, each set consisting of a resiliently journalled friction wheel kept in engagement with the spindle by an adjustable holder in which the drive wheel shaft is journalled, and a pair of rigidly journalled friction wheels, the drive to said friction wheels being applied at a point external to both sets of friction wheels.

8. A frictional driving mechanism for rotating a spindle at high speed in which said spindle is held between two sets of friction wheels, each set consisting of a resiliently journalled friction wheel kept in engagement with the spindle by an adjustable holder in which the drive wheel shaft is journalled, said holder adjustably mounted in a guide in the mechanism casing and acted upon by a spring, means being provided for subjecting the spring to a bias adjustable from the outside, and a pair of rigidly journalled friction wheels, the drive to said friction wheels being applied at a point external to both sets of friction wheels.

9. A frictional driving mechanism for rotating a spindle at high speed in which said spindle is held between two sets of frictional wheels, each set consisting of a resiliently journalled friction wheel and a pair of rigidly journalled friction wheels, the spindle and one of the friction wheels being arranged in axially interlocking relationship, one of the interlocking elements being composed of two parts, one of which is mounted for axial displacement and urged towards said other element by a biased spring capable of adjustment by a sleeve settable from the outside, and a drive to said friction wheels being applied to a point external to both sets of friction wheels.

10. A frictional driving mechanism for rotating a spindle at high speed in which said spindle is held between two sets of frictional wheels, each set consisting of a resiliently journalled friction wheel and a pair of rigidly journalled friction wheels, the spindle and one of the friction wheels arranged in axially interlocking relationship, one of the interlocking elements being composed of two parts, one of which is mounted for axial displacement and urged towards said other element by a biased spring capable of adjustment by a sleeve settable from the outside and mounted in a separate part of the casing, and a drive to said friction wheels being applied to a point external to both sets of friction wheels.

11. A frictional driving mechanism for rotating a spindle at high speed in which said spindle is held between two sets of friction wheels, each set consisting of a resiliently journalled friction wheel and a pair of rigidly journalled friction wheels, the drive to said friction wheels being applied at a point external to both sets of friction wheels, the shafts of the friction wheels being driven by separate shafts each connected with one of the friction wheel shafts by an elastic clutch.

References Cited in the file of this patent

UNITED STATES PATENTS

| | | |
|---|---|---|
| 297,407 | Jenkin | Apr. 22, 1884 |
| 438,197 | Smith | Oct. 14, 1890 |
| 581,759 | McCreary | May 4, 1897 |
| 616,396 | Billberg et al. | Dec. 20, 1898 |
| 690,884 | Silvestri | Jan. 7, 1902 |
| 1,537,009 | Hagman | May 5, 1925 |
| 1,660,489 | Hirvonen | Feb. 28, 1928 |
| 1,704,205 | Oakes et al. | Mar. 5, 1929 |
| 1,778,487 | Earnest | Oct. 14, 1930 |

FOREIGN PATENTS

| | | |
|---|---|---|
| 579,436 | Germany | June 28, 1933 |